US009841327B2

(12) United States Patent
Bottiglio et al.

(10) Patent No.: US 9,841,327 B2
(45) Date of Patent: Dec. 12, 2017

(54) METHOD OF PRODUCING CONDUCTIVE PATTERNS OF NANOPARTICLES AND DEVICES MADE THEREOF

(71) Applicant: Purdue Research Foundation, West Lafayette, IN (US)

(72) Inventors: Rebecca Kramer Bottiglio, Lafayette, IN (US); John William Boley, Allston, MA (US); Edward Lewis White, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 16 days.

(21) Appl. No.: 14/825,654

(22) Filed: Aug. 13, 2015

(65) Prior Publication Data
US 2016/0049227 A1 Feb. 18, 2016

Related U.S. Application Data

(60) Provisional application No. 62/037,580, filed on Aug. 14, 2014.

(51) Int. Cl.
G01L 1/00 (2006.01)
G01L 1/18 (2006.01)
G01L 1/20 (2006.01)
B82Y 30/00 (2011.01)
B82Y 40/00 (2011.01)

(52) U.S. Cl.
CPC ............... G01L 1/005 (2013.01); G01L 1/18 (2013.01); G01L 1/205 (2013.01); B82Y 30/00 (2013.01); B82Y 40/00 (2013.01)

(58) Field of Classification Search
CPC . G01L 1/005; G01L 1/18; G01L 1/205; H01L 31/0256; B82Y 30/00; B82Y 40/00;
(Continued)

(56) References Cited

U.S. PATENT DOCUMENTS 5,021,398 A * 6/1991 Sharma ................. C01G 3/006
427/226
5,152,805 A * 10/1992 Geddes ................. H01L 21/312
257/E21.259

(Continued)

OTHER PUBLICATIONS

Dickey, M. D., et al., Eutectic Gallium-Indium (EGaIn): A Liquid Metal Alloy for the Formation of Stable Structures in Microchannels at Room Temperature. Adv. Funct. Mater 2008, 18, 1097-1104.
(Continued)

Primary Examiner — Lisa Caputo
Assistant Examiner — Philip Cotey
(74) Attorney, Agent, or Firm — Purdue Research Foundation

(57) ABSTRACT

A method of processing a liquid material. The method includes mixing a liquid material with a solvent, wherein the solvent has a constituent capable of coating the particles of the material. The liquid material mixed with the solvent is then particlized, deposited on a substrate and activated to form a pre-defined electrically conductive pattern. Particlization methods include sonication and the deposition methods include ink-jet printing. Activation methods include applying mechanical pressure. The method can be used to produce electronic devices. The electronic devices made by the method include strain gauges. The substrates utilized for making the electronic devices utilizing the method can be wearable or stretchable or both.

20 Claims, 12 Drawing Sheets

(58) Field of Classification Search
CPC ..... C23C 14/086; C23C 16/407; C23C 16/30; C23C 18/1662
See application file for complete search history.

(56) References Cited

U.S. PATENT DOCUMENTS

| | | | | |
|---|---|---|---|---|
| 5,198,189 | A * | 3/1993 | Booth | B22F 1/025 252/387 |
| 2005/0129843 | A1* | 6/2005 | Wu | B22F 1/0022 427/180 |
| 2005/0136638 | A1* | 6/2005 | Voss-Kehl | C23C 24/08 438/610 |
| 2008/0145560 | A1* | 6/2008 | Khaselev | C09D 11/30 427/466 |
| 2009/0139421 | A1* | 6/2009 | Nakagawa | C23F 1/02 101/465 |
| 2009/0181177 | A1* | 7/2009 | Li | B82Y 30/00 427/383.1 |
| 2010/0022078 | A1* | 1/2010 | Rockenberger | C09D 5/24 438/585 |
| 2010/0078208 | A1* | 4/2010 | Inoue | H05K 3/246 174/261 |
| 2010/0178432 | A1* | 7/2010 | Kondo | C08J 7/123 427/535 |
| 2010/0276649 | A1* | 11/2010 | Maruyama | B82Y 30/00 252/582 |
| 2011/0220895 | A1* | 9/2011 | Hirai | H01L 29/7869 257/57 |
| 2012/0217453 | A1* | 8/2012 | Lowenthal | C09D 11/52 252/513 |
| 2013/0093122 | A1* | 4/2013 | Schulz | C01B 33/021 264/465 |
| 2013/0243655 | A1* | 9/2013 | Li | G01N 33/50 422/82.05 |
| 2013/0244037 | A1* | 9/2013 | Hohman | B82Y 30/00 428/402.2 |
| 2013/0316232 | A1* | 11/2013 | Iijima | C09D 135/00 429/211 |
| 2014/0007704 | A1* | 1/2014 | Granado | G01L 9/0052 73/862.627 |
| 2014/0134791 | A1* | 5/2014 | Vail | H01L 21/02425 438/102 |
| 2014/0147959 | A1* | 5/2014 | Raccurt | B82Y 30/00 438/95 |

OTHER PUBLICATIONS

Murphy, C. J., et al., Anisotropic Metal Nanoparticles: Synthesis, Assembly, and Optical Applications. J. Phys. Chem. B 2005, 109, 13857-13870.
Zhang, L., et al., Nanoparticles in Medicine: Therapeutic Applications and Developments. Clinical Pharmacology & Therapeutics | vol. 83 No. 5 | May 2008, 761-769.
Paul, S. et al., Langmuir-Blodgett Film Deposition of Metallic Nanoparticles and Their Application to Electronic Memory Structures. Nano Letters 2003, vol. 3, No. 4, 533-536.
Szot, K., et al., Switching the electrical resistance of individual dislocations in single-crystalline SrTiO3. Nature Materials, vol. 5, 2006, 312-320.
Guan, W., et al., Fabrication and charging characteristics of MOS capacitor structure with metal nanocrystals embedded in gate oxide. J. Phys. D: Appl. Phys. 40 (2007) 2754-2758.
Park, J., et al., Synthesis of Monodisperse Spherical Nanocrystals. Angew. Chem. Int. Ed. 2007, 46, 4630-4660.
Moon, K., et al., Thermal Behavior of Silver Nanoparticles for Low-Temperature Interconnect Applications. Journal of Electronic Materials, vol. 34, No. 2, 2005, 168-175.
Bhuvana, T., et al., Inkjet printing of palladium alkanethiolates for facile fabrication of metal interconnects and surface-enhanced Raman scattering substrates. Micro & Nano Letters, 2010, vol. 5, Iss. 5, pp. 296-299.
Chiechi, R. C., et al., Eutectic Gallium-Indium (EGaIn): A Moldable Liquid Metal for Electrical Characterization of Self-Assembled Monolayers. Angew. Chem. Int. Ed. 2008, 47, 142-144.
Angmo, D. et al., Roll-to-Roll Inkjet Printing and Photonic Sintering of Electrodes for ITO Free Polymer Solar Cell Modules and Facile Product Integration. Adv. Energy Mater. 2013, 3, 172-175.
Reinhold, I., et al., Argon plasma sintering of inkjet printed silver tracks on polymer substrates. J. Mater. Chem., 2009, 19, 3384-3388.
Mercade-Prieto, R., et al., Compression of elastic—perfectly plastic microcapsules using micromanipulation and finite element modelling: Determination of the yield stress. Chemical Engineering Science 66 (2011) 1835-1843.
Magdassi, S., et al., Triggering the Sintering of Silver Nanoparticles at Room Temperature. ACS Nano, 2010, vol. 4, No. 4, 1943-1948.
Grouchko, M., et al., Conductive Inks with a "Built-In" Mechanism That Enables Sintering at Room Temperature. ACS Nano, 2011, vol. 5, No. 4, 3354-3359.
Walker, S. B., et al., Reactive Silver Inks for Patterning High-Conductivity Features at Mild Temperatures. J. Am. Chem.Soc. 2012, 134, 1419-1421.
Higashiwaki, M., et al., Gallium oxide (Ga2O3) metal-semiconductor field-effect transistors on single-crystal β-Ga2O3 (010) substrates. Applied Physics Letters 100, 013504 (2012).
Hohman, J. N., et al., Directing Substrate Morphology via Self-Assembly: Ligand-Mediated Scission of Gallium-Indium Microspheres to the Nanoscale. Nano Lett. 2011, 11, 5104-5110.
Zhang, W., et al., Liquid Metal/Metal Oxide Frameworks. Adv. Funct. Mater. 2014, 24, 3799-3807.

* cited by examiner

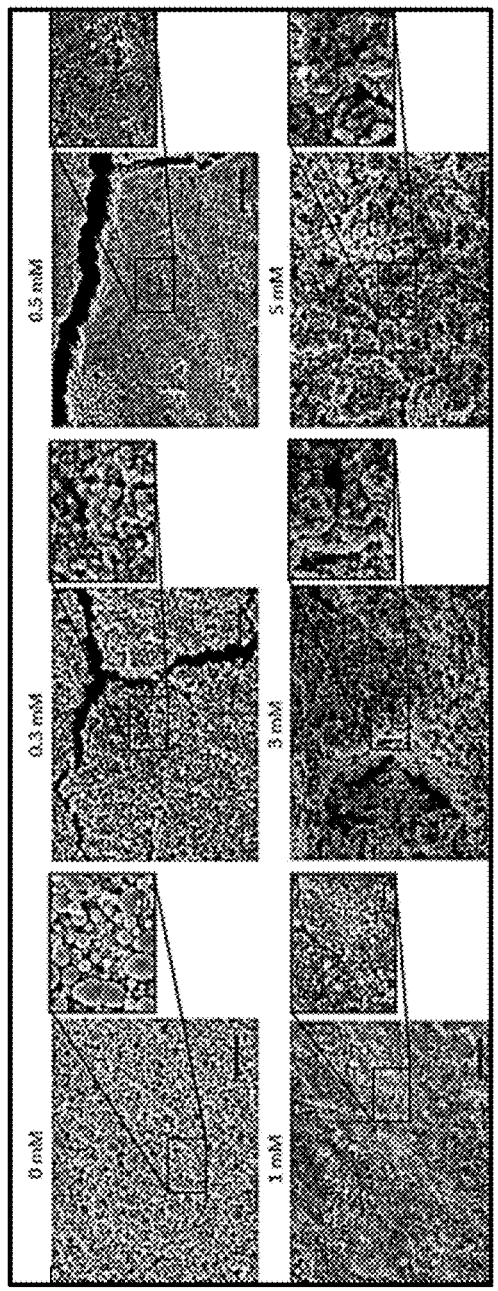
FIG. 6A
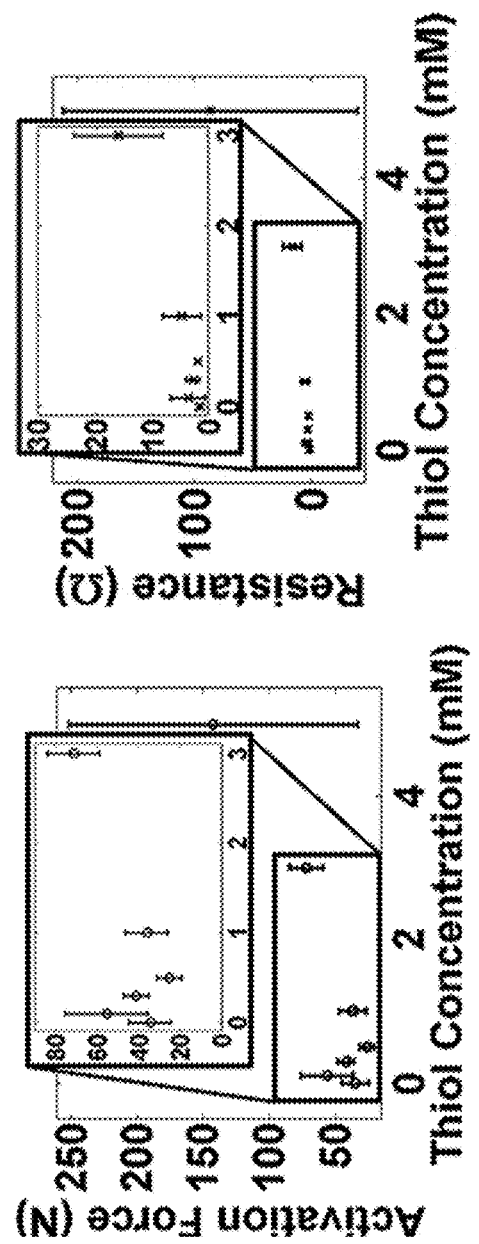
FIG. 6B
FIG. 6C

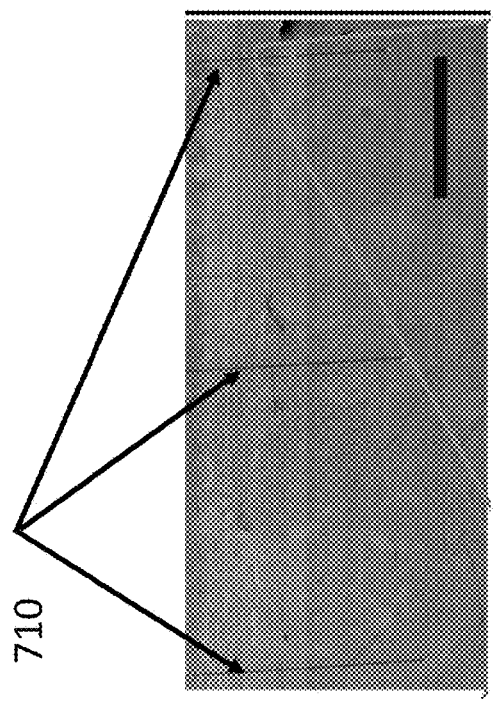
FIG. 7A
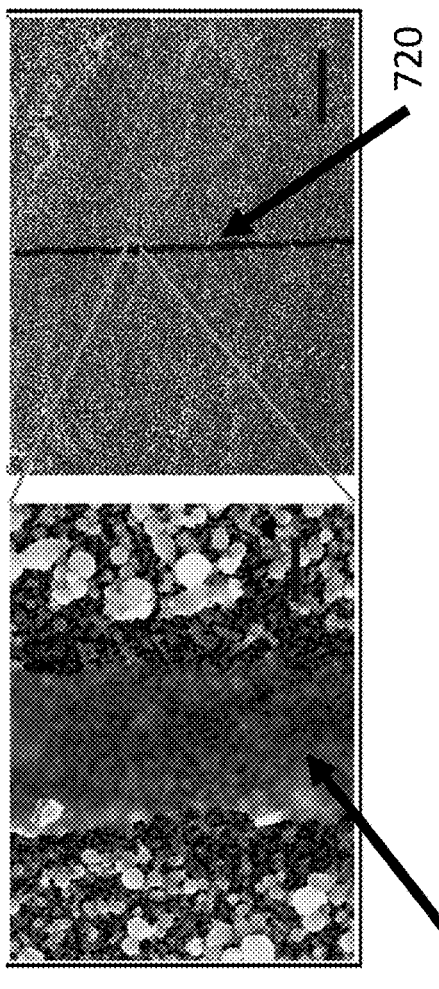
FIG. 7B
FIG. 7C

METHOD OF PRODUCING CONDUCTIVE PATTERNS OF NANOPARTICLES AND DEVICES MADE THEREOF

CROSS-REFERENCE TO RELATED APPLICATIONS

The present U.S. patent application is related to and claims the priority benefit of U.S. Provisional Patent Application Ser. No. 62/037,580, filed Aug. 14, 2014, the contents of which are hereby incorporated by reference in their entirety into the present disclosure.

TECHNICAL FIELD

The present disclosure generally relates to methods for producing electrically conductive patterns utilizing nanoparticles.

BACKGROUND

This section introduces aspects that may help facilitate a better understanding of the disclosure. Accordingly, these statements are to be read in this light and are not to be understood as admissions about what is or is not prior art.

In this disclosure we mean conductive to mean electrically conductive unless otherwise specified. Highly deformable soft machines require equally deformable soft electronics for sensing and power transport. Previously developed soft electronics utilize polymer based front-side electrode materials that provide advantages in flexibility, but have much higher sheet resistances than metals, leading to significant losses. In addition, conductive polymers are not as stretchable as most materials employed in soft robotic applications, significantly reducing their potential uses.

Metallic nanoparticles (MNPs) have been used since ancient times. Metallic nanoparticles can be formed from a metal or an alloy. Recent advancements in science and engineering have demonstrated the utilization of MNPs for applications in a broad array of fields, including optics, medicine, memory, and semiconductors. Many current applications require a sintering step in order to coalesce the deposited MNPs to enable functionality; whether it be thermal, photonic, plasmatic, or chemical in nature. Although ambient and local temperatures of current sintering methods are significantly lower than the melting point of the bulk materials, difficulties, such as damage to polymers at sintering temperatures, can still arise when integrating MNPs into functional devices with other materials such as chemically or thermally sensitive polymers.

Thus there is an unmet need for materials and methods that can produce high-conductivity nanoparticle patterns on sub stares that are stretchable, without the limitations of the conductive polymers used in previously developed technologies. Further it is desirable that such methods and materials lend themselves to scalable manufacturing processes and are capable of enabling fabrication of electronic devices to serve as platforms for soft robotics, safe human-machine interaction, active orthotics, wearable interfaces, or assistive medical devices for motion aid, prolonged endurance, and health monitoring.

SUMMARY

A method of processing a liquid material is disclosed. The method includes mixing a liquid material with a solvent which has a constituent that can coat particles of the material. The material mixed in the solvent is then particlized, wherein the particles are encased by the constituent of the solvent. The particlized material is then deposited on a substrate, and the deposited material is activated according to a predefined pattern, allowing coalescence of the activated material in the predefined pattern.

A method of making an electronic device is disclosed. The method mixing a liquid material mixing with a solvent which has a constituent that can coat particles of the material. The material mixed in the solvent is then particlized, wherein the particles are encased by the constituent of the solvent. The particlized material is then deposited on a substrate, and the deposited material is activated according to a predefined pattern, allowing coalescence of the activated material, such that the activation results in mechanical sintering of the particles and results in electrical conductivity of the predetermined pattern forming an electronic device.

An electronic device is disclosed. The electronic device contains a substrate which a predefined pattern of nanoparticle networks, wherein the particles have a coating on their surfaces. The device further contains an electrically conductive pattern formed on the substrate, wherein the electrically conductive patterns are formed by applying mechanical pressure on the predefined pattern of nanoparticle networks on the substrate, disrupting the coating on the surfaces of the particles resulting in the predefined pattern of nanoparticle networks becoming electrically conductive.

A method of processing eutectic Ga—In alloy which is a liquid at about room temperature is disclosed. The method includes mixing eutectic Ga—In alloy which is liquid at about room temperature with a solvent containing ethanol and thiol and particlizing the eutectic Ga—In alloy mixed in the solvent by sonication, wherein the particles have a diameter in the range of 10 nm to 1000 nm and are encased by the thiol in the solvent. The particlized material is then deposited on a wearable and stretchable substrate and the deposited material is activated by applying mechanical pressure according to a predefined pattern, allowing coalescence of the liquid particles of the activated material, resulting in electrical conductivity of the predefined pattern.

BRIEF DESCRIPTION OF DRAWINGS

While some of the figures shown herein may have been generated from scaled drawings or from photographs that are scalable, it is understood that such relative scaling within a figure are by way of example, and are not to be construed as limiting.

FIG. 4A shows voltage output versus applied force derived from compression experiments on samples with average particle diameter of 220 nm; FIG. 4B shows voltage output versus applied force derived from compression experiments on samples with average particle diameter of 230 nm; FIG. 4C shows voltage output versus applied force derived from compression experiments on samples with average particle diameter of 440 nm; FIG. 4D shows voltage output versus applied force derived from compression experiments on samples with average particle diameter of 600 nm.

FIG. 6A shows representative SEM images of deposited samples prepared with different concentrations of thiol.

FIG. 6B shows dependence of activation force on thiol for all concentrations of thiol considered, with accompanying detail at lower concentrations FIG. 6C shows dependence of resistance across coalesced sample after activation on thiol concentration, with inset showing details of dependence at lower concentrations.

FIG. 7A shows arrays of ≈1 μm wide coalesced lines.

FIG. 7B shows a detail view featuring a single coalesced line

FIG. 7C shows a single coalesced line revealing liquid-phase morphology.

DETAILED DESCRIPTION

Figure 1:
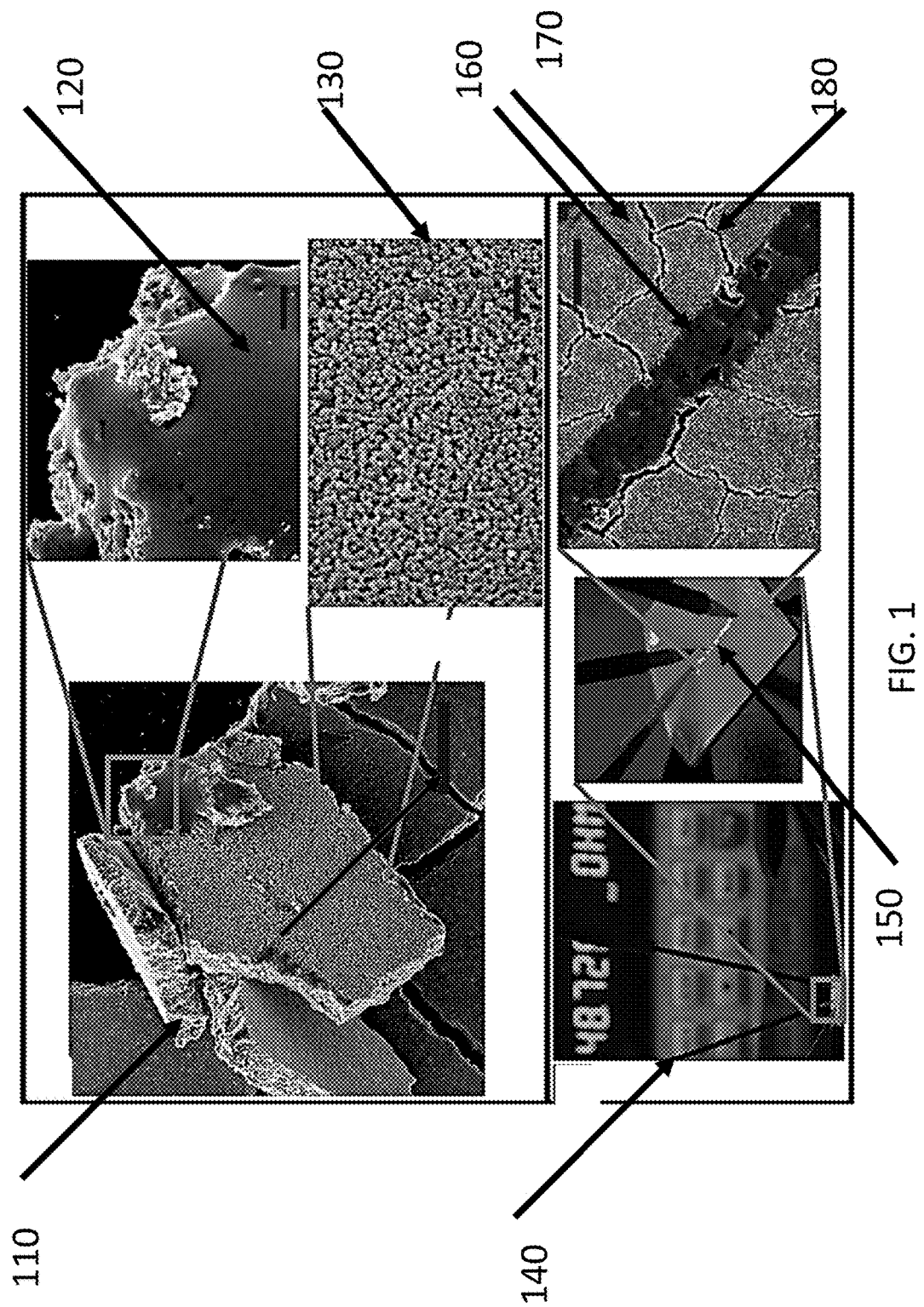
FIG. 1 shows local stress-induced coalescence of EGaIn-NPs. using SEM images of plowed pile of EGaInNP chips with detail views of liquid EGaIn formed during the plowing process (right-top) and in-tact nanoparticles (right-bottom).

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

In this disclosure, a new class of MNPs that are "mechanically sintered" at and below room temperature are described. Using eutectic gallium-indium (EGaIn) MNPs coated with $Ga_2O_3$ or a thiol, particle coalescence is demonstrated via the application of low pressures, which ruptures the particle coatings and releases the low-viscosity liquid-metal. This phenomenon is observed morphologically through scanning electron imaging and electrically through two-probe measurements during compression. Fusing the results of this study with the unique properties of EGaIn and the semiconductive nature of $Ga_2O$ will facilitate new applications as will be described. In this disclosure, it is demonstrated that EGaIn MNPs are compatible with scalable additive manufacturing technologies such as inkjet printing, and can be used to fabricate flexible/stretchable integrated devices across multiple length scales.

In experiments leading to this disclosure, EGaInNP samples were prepared as follows. First, a fixed mass (362 mg) of EGaIn (product number 495425 as purchased from Sigma Aldrich) using a syringe and a mass balance (OHAUS Pioneer™) is added to the bottom of a Kimble Chase 3 dram glass vial. Following this, 4 mL ethanol/thiol solutions were added to the vial by micro-pipetting (BioPette Plus BPP1000) a prescribed volume combination of highly concentrated ethanol-thiol solution and neat ethanol (Koptec part number V1001) to achieve a desired concentration of thiol. The ethanol-thiol solution is termed a solvent for purposes of this disclosure. The ethanol-thiol solution is just one example of a solvent that can be used as described in this disclosure. Non-limiting examples of other solvent systems include acetone-thiol and toluene-thiol. It should be recognized that it is not a requirement that the solvents for purposes of this disclosure contain thiol. Other materials that can be used in place of thiol include, but not limited to, include gallium and indium metal, oxides of gallium and indium, thiols, polymers such as polydimethylsiloxane, or other metals not present in the core of the nanoparticle such as tin and copper. Other possibilities for materials that can be used in place of thiol include oxides, polymer shells, plastic shells, thin metallic shells, ceramic shells . . . . In the experiments solutions of high thiol concentrations were made by adding a measured amount of thiol (3-Mercapto-N-nonylpropionamid; part number 686492 as purchased from Sigma Aldrich) mass to a glass vial, followed by the addition of the appropriate volume of ethanol. The resulting mixture was shaken vigorously followed by a 1-minute bath sonication (Branson 1800) at room temperature to achieve uniformity. One purpose of thiol is to aid dispersion. Other materials that can aid dispersion include surfactants such as soap.

To achieve the objectives of this disclosure, it is necessary to create individual particles from the EGaIn sample. For purposes of this disclosure this will be termed particlization. Thus in this disclosure we mean particlization to mean production of particles from a liquid material. The particles formed by particlization can be nanoparticles. One method of particlization employed in the experiments is sonication, leading to nanoparticles of EGaIn, also termed EGaInNP. EGaInNP samples were made using a QSonica Q700 microtip sonicator (part number 4417) at 30% amplitude (96 μm) inserted a fixed distance (≈1 mm) above the. All samples including thiol were sonicated for 60 minutes. Each EGaInNP dispersion sample was allowed to settle for 24 hours. Just prior to creating samples for particle characterization and compression testing, each sample was shaken vigorously and magnetically stirred for 5 minutes to ensure uniform dispersion of EGaInNP. Uniformity of EGaInNP concentration was confirmed by measuring the post-evaporation mass of 1 mL samples. Multiple dispersions (N=5) were made for each set of conditions (thiol concentration and sonication time) for confidence. High speed centrifugation was employed to rinse the 3 mM and 5 mM samples to confirm the presence of excess thiols. M stands for molarity; so, 3 mM and 5 mM represent solutions 3 milli-molar and 5 milli-molar solutions of thiol respectively. Sonicated samples were subjected to 6238 relative centrifugal force in a centrifuge (Cole Parmer® WU-39065-05) for 20 minutes. After centrifugation, the aliquot was discarded, fresh ethanol was added, and the pellet was re-suspended in a light sonication bath (Branson 1800) for approximately 3 minutes. This process was repeated twice for each sample. The particles produced by sonication will have an oxide coating that forms spontaneously. Sonication can be by a tip or by a bath. Methods of particlization, other than sonication are possible. They include, but not limited to, milling, grinding, and droplet formation with microfluidic devices.

It should be noted that the EGaIn dispersions produced by this method contain nanoparticles which are essentially liquid droplets with a thin solid shell of Ga2O3. These particles were characterized for size and size distribution. Samples for particle characterization were prepared by depositing 50 μL via micro-pipette (BioPette Plus BPP200) onto Si wafers (Silicon Sense, Inc., 0.0035-0.0038 Ωcm). SEM (Philips XL-40 FEI, 15 kV, 3 μm beam spot size) images were then obtained. All images were analyzed using the following procedure through ImageJ: 1) each raw grayscale SEM image was converted to a binary image (Image→Adjust→Threshold, with a lower cutoff of ≈15 and an upper cutoff of ≈230 and Dark background option); 2) each resulting binary image was segmented using the built-in ImageJ watershed routine (Process→Binary→Watershed); 3) the sizes for all segmented particles was obtained using ImageJ's particle analysis package (Analyze→Analyze Particles, with size range going from 10 square pixel units to infinity, circularity from 0 to 1, showing bare outline of particles); 4) the diameter for each particle was computed from the area output by ImageJ under a spherical approximation. This process was repeated over multiple experimental trials (N=5) for each formulation condition. An FEI Quanta 3D FEG Dual-beam SEM with an Oxford INCA Xstream-2 silicon drift detector with Xmax 80 window was employed for Energy-dispersive X-ray spectroscopy. The SEM system used to inspect the morphology of the rinsed samples is the same used for particle characterization on the thiol free and non-rinsed samples.

EGaInNP chips were produced as colloidal deposits by drop casting 50 µL of EGaInNP dispersion onto a Si wafer (0.0035-0.0038 Ωcm Si wafers (Silicon Sense, Inc.)), followed by a line-carving step with a diamond scribe. The coalesced line of liquid EGaIn was formed by gently tapping a similarly drop-casted film of EGaInNPs with an X-Acto® knife. FIG. 1 shows local stress-induced coalescence of EGaInNPs. The above described coalescence wherein the oxide layer is disrupted (in this case to achieve electrical contact between nanoparticles) will be termed as activation for purposes of this disclosure. In this disclosure we use the term activation to mean disruption of a coating on the particles to form coalesced liquid particles. If the particles are coalesced or sintered by applying mechanical force we can call it mechanical sintering. This stress-induced or pressure-induced coalescence is one example of mechanical sintering. Other methods of applying mechanical stress to break up the oxide layer are possible. Referring to FIG. 1, shown is a deliberately plowed (resulting in a furrow which we later term as a line) pile of chips 110 formed from a dried film of EGaInNPs (scale bar is 40 µm in length). FIG. 1 shows micro-cracks in the deposits as is commonly observed in dried colloidal deposits.

Referring to FIG. 1, 120 is a detailed view of liquid EGaIn formed during the plowing process (scale bar is 5 µm in length), and 130 shows in-tact (meaning not yet coalesced) nanoparticles (scale bar is 5 µm in length). Furthermore, the stability of the chips indicate "solid-like" behavior of the deposit and high inter-particle adhesion, both characteristic of the oxide coating on each particle that forms spontaneously. During the plowing process, some local areas of the film experienced stresses large enough to coalesce the EGaInNPs into a continuous liquid phase resulting in a high breakdown field of ≈50 kV/m. It should be noted that that the characteristics of this breakdown field will vary depending on the amount of $Ga_2O_3$ present in the sample due to semiconductive nature of $Ga_2O_3$.

Electrical measurements have demonstrated that EGaInNPs formed per the process above continuing oxide coating are do not have appreciable conductivity, and would be considered insulative by those skilled in the art.

Samples for I-V characterization were made by spincoating EGaInNPs/ethanol dispersions (0 mM) onto Kapton® substrates. Two-probe measurements were conducted on the non-sintered samples by positioning electrical probes (Signatone SE-TZ) via micro-manipositioners (Sgnatone S-926) onto the sample a spacing of ≈1 mm apart tracking the supplied voltage and measured current through a Keithley 2410-C SourceMeter®. Voltage sweeps were performed manually, waiting ≈30 s for signal stabilization after each step prior to recording.

Arrays of thin lines were produced via mechanical sintering by moving an EGaInNP-deposited sample (1 mM) in straight lines relative to a stationary mechanically cleaved Si needle (radius of needle ≈1 µm). The substrate motion relative to the needle was controlled through a 3-axis motion system (PI: 2×M-531.DD, M-501.PD, C-843.41). Prior to motion, contact between the Si needle and the sample was observed through a 3D optical profiler (Zeta-20 with a customized tiltable turret). FIG. 1 also illustrates that by selectively ploughing the deposit as described above, the coalesced area displays a low electrical resistance (≈49Ω) and appears as a continuous liquid film. In FIG. 1, 140 represents the resistance measurement of a liquid EGaIn line, a detail of which is shown as 150 in FIG. 1. In FIG. 1, 160 represents SEM image of a liquid EGaIn line demonstrating the conversion of part of the nanoparticle network 130 to a coalesced line of liquid 160. (scale bar is 20 µm in length).

The above observations confirm that mechanical coalescence of EGaInNPs changes their electrical properties from non-conductive to conductive. Moreover, this process is irreversible. Once the protective layers have been ruptured and the liquid metal coalesces into a single body, its cohesion allows it to remain intact and electrically conductive.

A method of activiting a network of EgaInNP is through mechanical compression. Compressive forces were applied on drop-casted networks of EGaInNPs in the absence of any stabilizing agents (e.g. thiols) in order to demonstrate global sintering and to quantify the required forces to sinter particles of different sizes. Polydimethylsiloxane (PDMS) devices containing copper wires were made to serve as EGaInNP reservoirs for the compression tests. Specifically, PDMS (Sylgard® 184) was mixed as received from Dow Corning with a 10:1 weight ratio of base to crosslinking agent. The resulting mixture was spincoated onto glass slides, yielding a thickness of ≈350 µm. After fixing copper wires to the cured PDMS films, a second coat of ≈200 µm was applied via spincoating. Finally, samples were cut and circular reservoirs ≈200 µm deep with a diameter of ≈2.5 mm were made in a single step using a laser ablation technique. The compression tests were conducted using a materials tester. Each device was fixed to a platen loaded into a single column materials testing unit (Instron® model 3345) fitted with a 1 kN load cell. The electrodes of the of the device were attached to a Wheatstone bridge, where the three other legs of the bridge were 20Ω resistors and the voltage supply was 3 VDC. The output voltage of the bridge was connected to the data acquisition of the materials tester and tracked with applied force during the experiments. All samples were compressed at a rate of 1 mm/min. This process was repeated over multiple experimental trials (N=5) for each formulation condition.

Samples for particle characterization were prepared by depositing 50 µL via micro-pipette (BioPette Plus BPP200) onto Si wafers (Silicon Sense, Inc., 0.0035-0.0038 Ωcm). SEM (Philips XL-40 FEI, 15 kV, 3 µm beam spot size) images were then obtained. All images were analyzed using the following procedure through ImageJ: 1) each raw grayscale SEM image was converted to a binary image (Image→Adjust→Threshold, with a lower cutoff of ≈15 and an upper cutoff of ≈230 and Dark background option); 2) each resulting binary image was segmented using the built-in ImageJ watershed routine (Process→Binary→Watershed); 3) the sizes for all segmented particles was obtained using ImageJ's particle analysis package (Analyze→Analyze Particles, with size range going from 10 square pixel units to infinity, circularity from 0 to 1, showing bare outline of particles); 4) the diameter for each particle was computed from the area output by ImageJ under a spherical approximation. This process was repeated over multiple experimental trials (N=5) for each formulation condition. An FEI Quanta 3D FEG Dual-beam SEM with an Oxford INCA Xstream-2 silicon drift detector with Xmax 80 window was employed for Energy-dispersive X-ray spectroscopy (results shown in Supplemental Figures S3-S7). The SEM system used to inspect the morphology of the rinsed samples is the same used for particle characterization on the thiol free and non-rinsed samples.

Figure 2C:
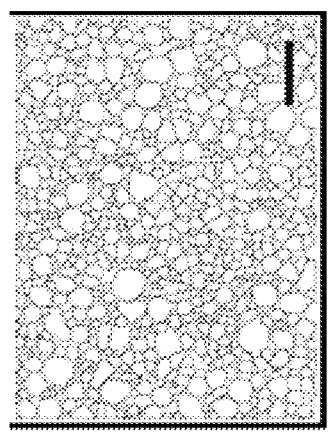
FIGS. 2A, 2B and 2C represent a process map for determining particle sizes with FIG. 2A showing the raw SEM image, FIG. 2B showing the black and white converted image, and FIG. 2C showing the resulting segmented image.
Figure 2B:
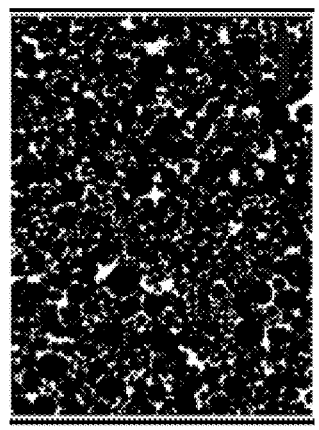
Figure 2A:
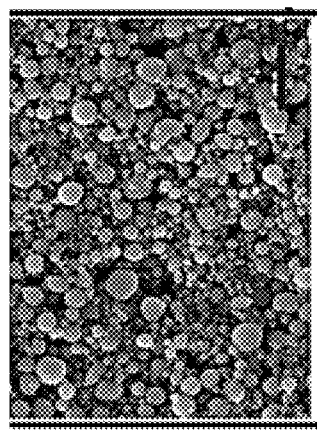
Figure 3:
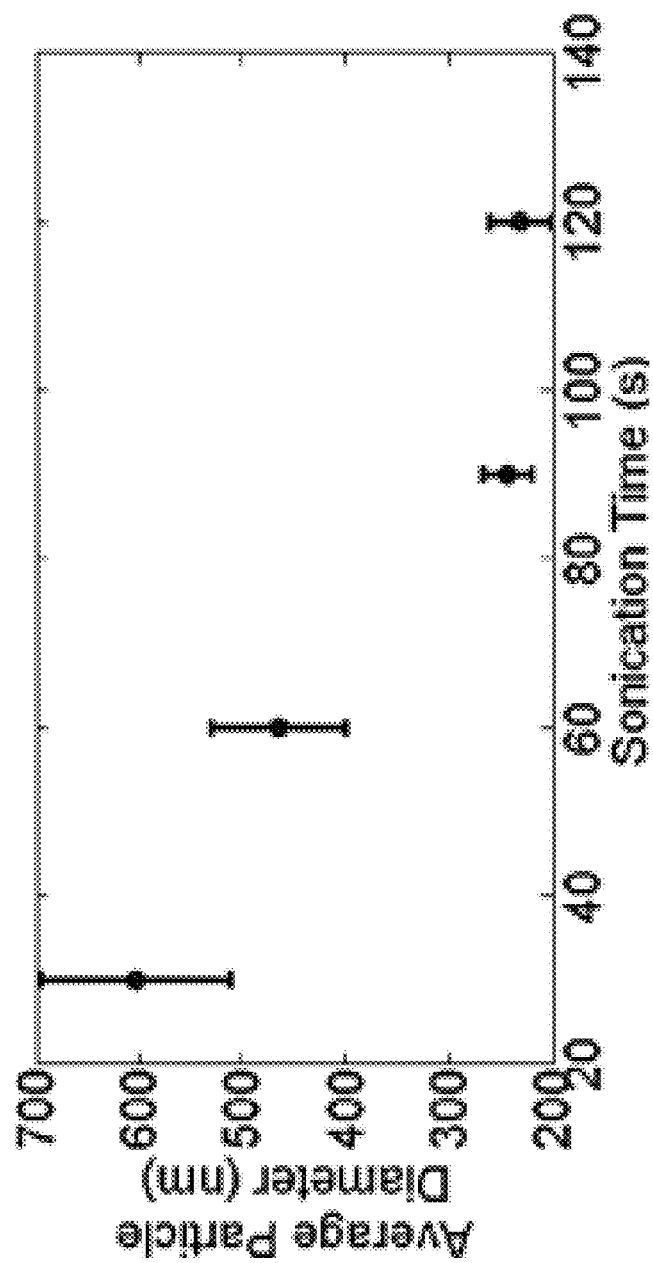
FIG. 3 shows average particle diameters as a function of sonication time.

FIGS. 2A, 2B, and 2C illustrate characterization work done on EGaInNPs without stabilizing agents. FIGS. 2A, 2B, and 2C show the process for obtaining particle size distribution. Briefly, the raw scanning electron microscope (SEM) images (FIG. 2A) were converted from grayscale to black and white (FIG. 2B), followed by a segmentation step. The output of the segmentation step (FIG. 2C) was then used to obtain the size distributions for each sample. In FIGS. 2A, 2B, and 2C the scale bars are 2 μm in length. FIG. 3 shows average particle diameter and corresponding standard deviations as a function of sonication time. Since all samples were prepared using the same sonication conditions except for sonication time, FIG. 3 indicates that the particle size is tunable and that an increase in ultrasonic irradiation dosage results in a smaller particle size.

In this disclosure we use the term metal" to designate either a pure metal or an alloy made of two or more metals.

Figure 4A:
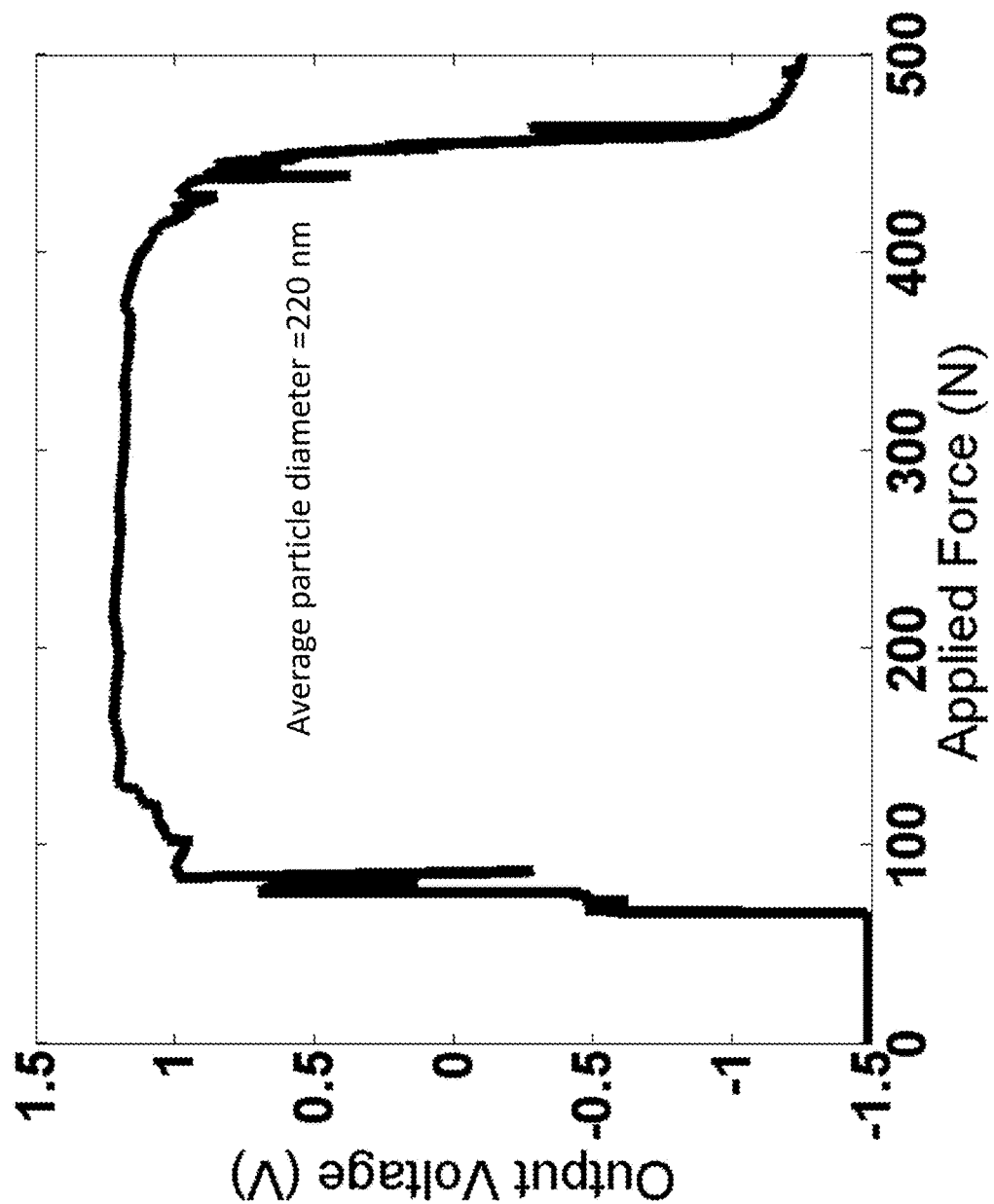
FIGS. 4A, 4B, 4C and 4D show voltage output versus applied force derived from compression experiments on samples of different particle sizes. Specifically
Figure 4B:
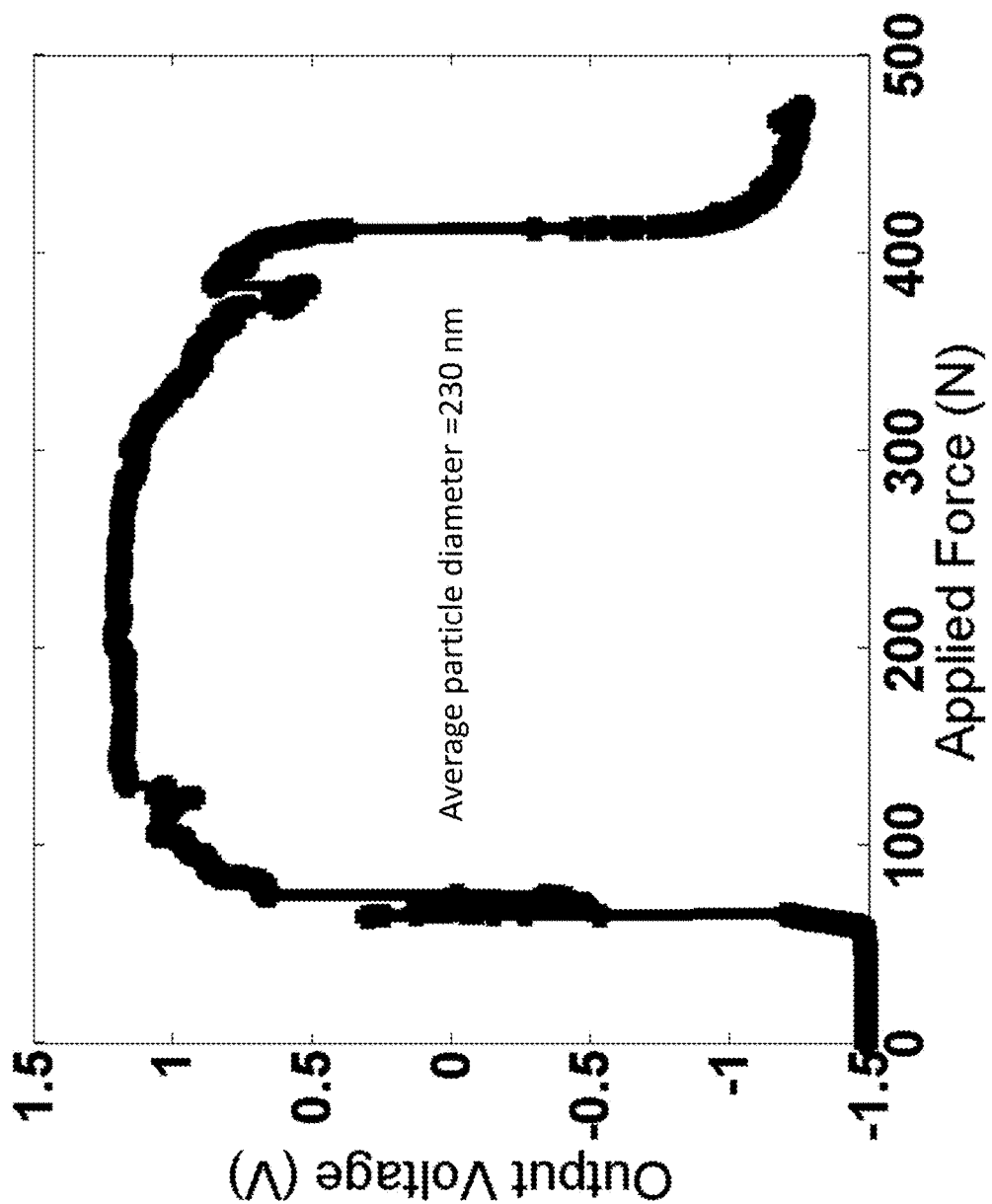
Figure 4C:
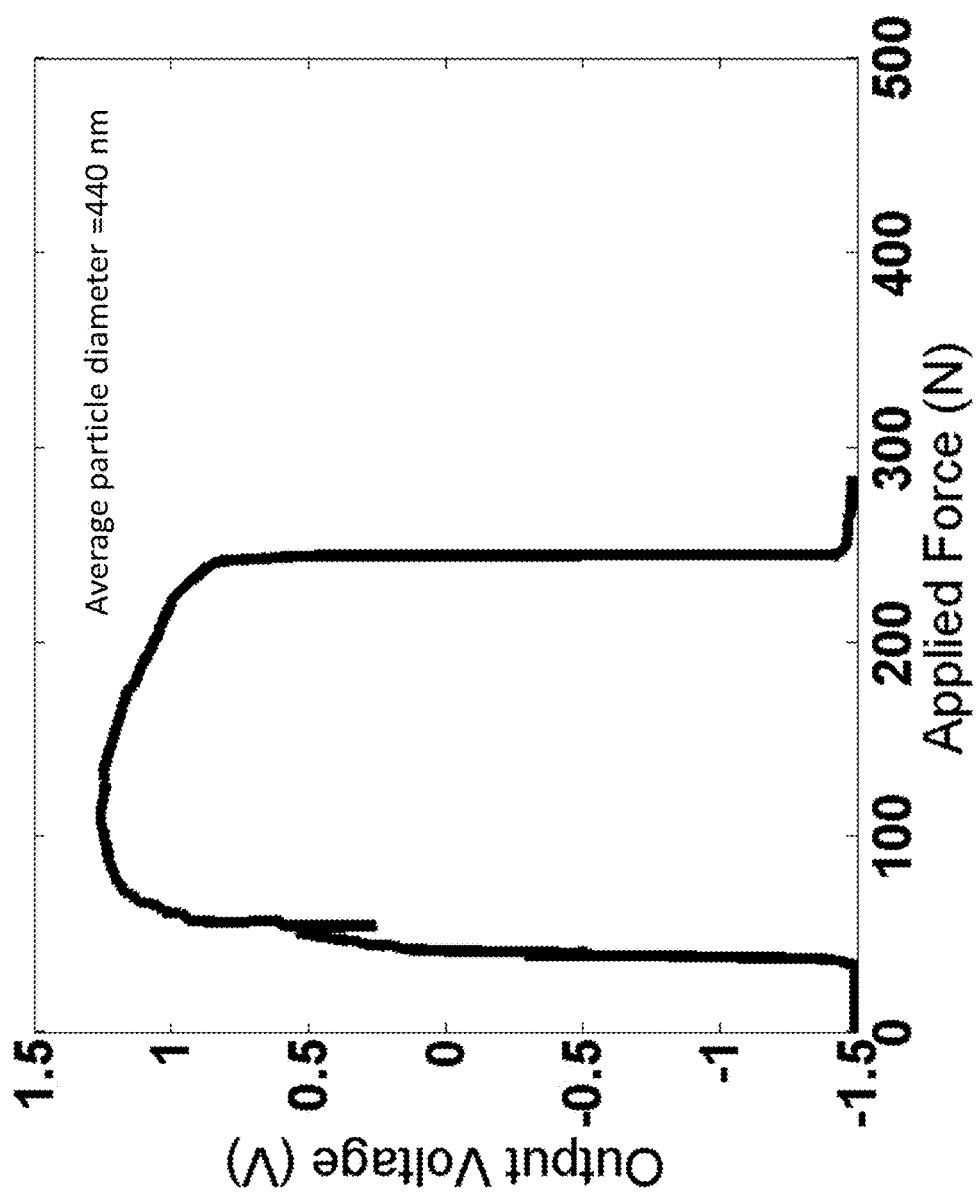
Figure 4D:
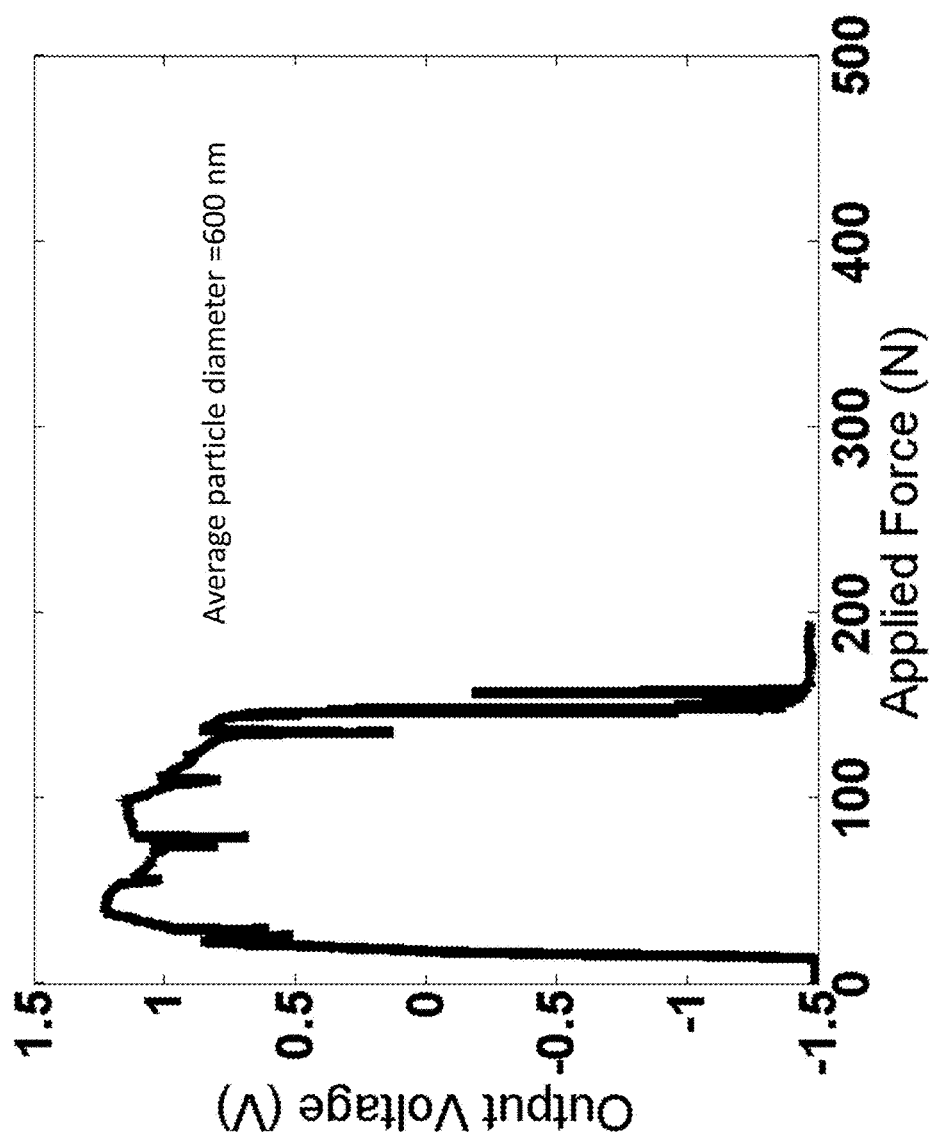

FIGS. 4A through 4D show the results of compression tests conducted as described above. Shown in FIGS. 4A through 4D are representative voltage output versus applied force from compression experiments on samples of different particle sizes, namely 220 nm (FIG. 4A), 230 nm (FIG. 4B), 440 nm (FIG. 4C and 600 nm (FIG. 4D). In each case, Output voltage is across a Wheatstone bridge. −1.5V corresponds to an open circuit. ~1.2V corresponds to a short circuit (i.e. the material is conductive). In general, all samples exhibited the following sequence: 1) an initial non-conductive state until a critical activation force is reached, followed by 2) a jump in voltage corresponding to a metal-like resistivity. For purposes of this disclosure by metal-like resistivity we mean resistibility of the corresponding bulk liquid metal. In this case we mean that the resistivity of the coalesced EgaInNP line is about the same as the bulk resistivity of the eutectic Ga—In liquid metal; 3) a dwell period, where the voltage remains relatively constant until a critical deactivation force is reached, and finally 4) a sudden drop in voltage, indicating the squeezing of the liquid metal film from beneath the compressing tool to the surrounding environment.

Figure 5:
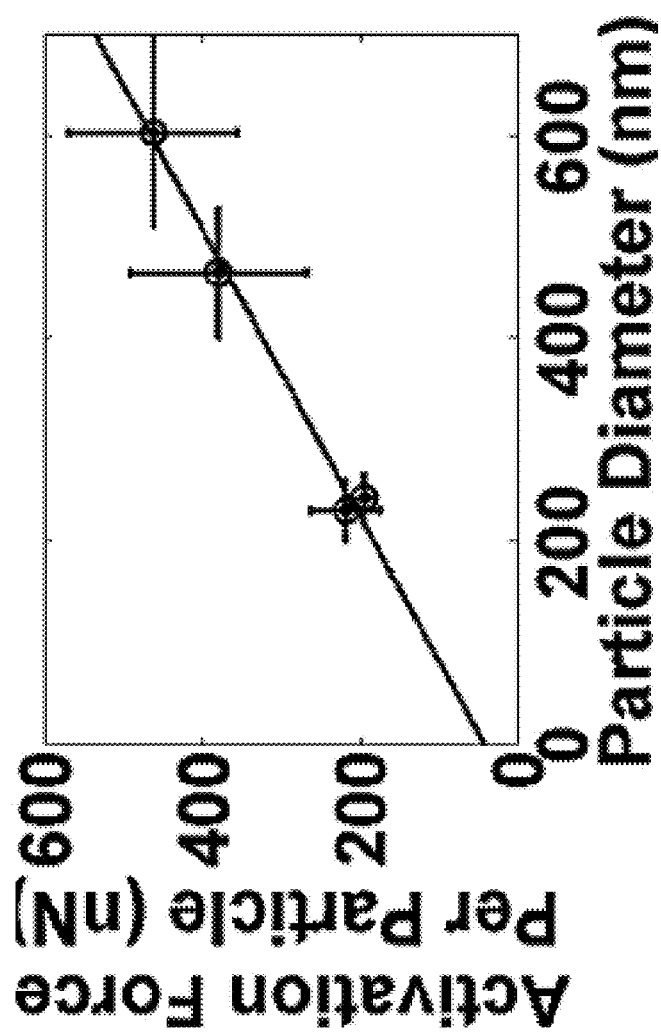
FIG. 5 shows estimated activation force per particle versus particle diameter.

The first stage of FIGS. 4A through 4D is a non-conductive state up to activation force. In order to gain a better understanding of the dependence of activation force on particle size, the results were re-cast in terms of estimated activation force per particle. Thus, FIG. 5 shows estimated activation force per particle versus particle diameter (Vertical and horizontal error bars are two standard deviations in length. Line represents linear fit through the data.)

The activation force per particle f is the force that each particle in contact with the punch experiences at activation and was calculated by $$f = \frac{d^2}{pD^2} F \quad \text{(Equation 1)}$$

where F is the measured activation force applied by the punch onto the sample, D=4.5 mm±0.3 mm is the diameter of the circular polystyrene punch, d is the average particle diameter, and p is the areal packing factor of the particles (assumed to be constant at 0.82, corresponding to a random packing arrangement. An adjusted $R^2$ value of 0.98 indicates that the activation force per particle increases linearly with average particle size, which agrees with a previous study on the bursting strength of micro-scale oil-filled particles with formaldehyde walls. The physical mechanism behind this effect comes from the naturally formed $Ga_2O_3$ layer surrounding each of the particles in the network. When a given particle undergoes enough strain, this viscoelastic shell will fracture, inducing an outward flow of encased EGaIn. Since this happens over all particles in contact with the punch, the liquid EGaIn released then coalesces to form pathways for metal-like electron transport.

The linear trend displayed in FIG. 5 can be modeled using the theory of thin, elastic-perfectly plastic, fluid-filled membranes. Previous studies have reported that the naturally forming $Ga_2O_3$ outer layer of Ga—In alloys in air is inherently conformal and fast-forming. More specifically, x-ray reflectivity measurements show that the thickness of the $Ga_2O_3$ layer is t≈0.5 nm, which is much smaller than the particle radii in this study. Additionally, from previous experiments, the stress-strain relationship of the $Ga_2O_3$ layer was found to behave elastically up to the fracture strain, after which there is no significant change in stress. Therefore, the theory of thin, elastic-perfectly plastic, fluid-filled shells is applicable. Using data from literature, the modulus of elasticity (E) and the yield stress ($\sigma_y$) of $Ga_2O_3$ are estimated to be ≈39 GPa and ≈1 GPa, respectively. Interpreting the activation force as the yielding force, the results depicted in FIG. 5 for the compressed network can be effectively modeled as a single incompressible fluid-filled spherical shell of the same diameter squeezed between two flat plates, yielding at high deformations. Next, using the slope of the linear fit from FIG. 5 (m=0.78 nN/nm±0.27 nN/nm) enables us to calculate the Mercad'e-Prieto fitting parameter ($k_\epsilon$), known to those skilled in the art, $$k_\varepsilon = \frac{2m}{t\sigma_y} \approx 3.11 \quad \text{(Equation 2)}$$

Using this value for $k_\epsilon$ and interpolating from Mercad'e-Prieto's finite element results corresponds to an effective compression of 0.44d, which indicates that the effective particle will rupture when compressed by 44% of its original diameter. This amount of compression may be larger than that of a single particle in compression due to the effects of compaction, interparticle interactions, and the occurrence of micro-cracks within the deposit. The difference in the dwell period (stage three of the sintering process) stems from the amount of $Ga_2O_3$ present with each sample. Samples with smaller particle sizes inherently contain larger amounts of $Ga_2O_3$ (i.e. smaller particles result in a larger amount of surface area exposed to oxygen, resulting in increased amounts of $Ga_2O_3$). As the concentration of $Ga_2O_3$ increases, so does the mechanical rigidity, since $Ga_2O_3$ is known to be a viscoelastic material. As mechanical rigidity increases, so does its resistance to flow or deformations for a given force (i.e. effective surface tension), which explains the observed increased dwell period with decreased particle size.

FIGS. 4A through 4D also show an apparent gradual voltage drop throughout the dwell period. This observed drop is attributed to the gradual removal of material between the electrodes during the compression process. Moreover, the decrease in slope of this drop with decreased particle size can be explained by the increased structural stability coming from the higher amounts of oxide. The maximum output voltage achieved after reaching the activation force remained constant throughout all trials (95% confidence interval of 1.23V±0.19V), indicating indistinguishable electrical resistance effects from increased amounts of $Ga_2O_3$ with decreased particle size over the range of particle sizes tested. With the role of the $Ga_2O_3$ layer established in the mechanical sintering process, we now turn our focus to the effects of replacing this layer with a different material.

Steric stabilization and size reduction of MNPs with thiols is well documented in literature. However, it is also important to understand the effects of thiols on the morphology and sintering performance of the deposited material. Therefore, in experiments leading to this disclosure a process has been developed to arrive at an appropriate thiol concentration for a given sonication condition that leverages the steric stabilization of the thiol while preserving the mechanical sintering property. FIGS. 6A, 6B and 6C show the effects of thiol concentration on several parameters of EgaInNPsa 60-minute sonication condition with the equipment used as described above. FIG. 6A shows representative SEM images of deposited samples prepared with different concentrations of thiol, the concentrations indicated along with the images. Scale bars of main images are 10 μm in length. Scale bars of corresponding detail images are 2 μm in length. Beginning with deposit morphology (see FIG. 6A), for thiol concentrations ≤1 mM it is evident that the particles are polydispersed. However, as we increase the thiol concentration between 0 mM and 0.5 mM, we observe a more bimodal-like distribution with increased clustering of similarly-sized particles. We attribute this effect to insufficient thiol levels, where non-thiol-capped particles are likely to aggregate since there is no thiol providing steric stabilization. This trend levels off at a concentration of 1 mM, where the particles seem to be mostly monodispersed. The average particle diameter of the EGaInNPs for the 1 mM samples (180 nm±32 nm) is considerably smaller than that of samples without thiol (465 nm±65 nm). Increasing thiol concentration beyond 1 mM results in agglomeration the EGaInNPs, which appears to be a result of excess thiols. The excess thiols appear on the samples as a continuous clear film surrounding the EGaInNP aggregates (see the detail image of the 5 mM sample in FIG. 6A). Rinsing the higher thiol concentration samples (≥3 mM) prior to deposition verifies the presence of this film. Therefore, the optimized ratio of EGaIn to thiol concentration for this system is ≈400:1 by weight.

Compression tests were also conducted to see how thiols affect the mechanical sintering phenomenon utilizing similar experimental detail as described above for effecting mechanical compression. FIG. 6B shows dependence of activation force on thiol concentration for all concentrations considered, with accompanying detail at lower concentrations. Errorbars are two standard deviations in length. As evident in FIG. 6B, the required activation force (F) applied by the punch remains consistent for thiol concentrations ≤1 mM. However, the significant size reduction associated with the 1 mM concentration samples results in a much lower activation force per particle (f≈25 nN). This value is significantly less than that predicted by the linear model for thiol-free EGaInNPs of the same size shown in FIG. 5 168 nN). This observed reduction in activation force per particle indicates a combined effect of softening, weakening, or thinning of the EGaInNP surface in the presence of the thiols. The rupture mechanism facilitating the coalescence of the thiol-capped EGaInNPs is considered to be the same as that of the oxide-encased particles. These results suggest that the thiol coating ruptures more easily than the $Ga_2O_3$ coating, and therefore the effective surface tension of the thiol-capped particles must be lower than that of the $Ga_2O_3$ coated particles. This decrease in effective surface tension facilitates the production of smaller particles in the presence of thiol. In this regard, a size reduction is expected to occur in the presence of thiol across multiple sonication conditions. FIG. 6C shows dependence, on thiol concentration, of resulting resistance across coalesced sample after activation (one inset of FIG. 6C shows details of dependence at lower concentrations. Errorbars are two standard deviations in length). As indicated by the plots in FIGS. 6B and 6C, the presence of excess thiol inhibits the formation of percolation pathways for the EGaIn during compression, resulting in increased activation forces and film resistances, as well as their corresponding uncertainties.

Additional experiments were conducted to produce smaller features by selective mechanical sintering. Arrays of smaller lines can be formed simply by scaling down the plouging tool or the compression tool (in general, the activation tool) in the line-making experiments described above. In this study, 1 μm coalesced EGaIn lines were formed, which are half the size of previously reported features. It is to be noted that it is possible achieve sub-micron features by suitably reducing the size of the sintering tool. FIGS. 7A, 7B and 7C illustrate such small scale line coalescence. In FIG. 7A 710 represents arrays of ≈1 μm wide coalesced lines (scale bar is 500 μm in length), while 720 is a detail view featuring a single coalesced line (scale bar is 20 μm in length), and 730 represents single coalesced line revealing liquid-phase morphology (scale bar is 500 nm in length).

It should be noted that in this disclosure we discussed and described coating of particles. In these methods it is generally intended that all particles are coated. However, those skilled in the art would recognize that due to proceeding variations and practical limits, in some cases a small percentage, say 10% or less by way of example, may not be coated. We can term this situation as "substantially all particles are coated". For purposes of this disclosure when we say "coated" we mean all particles are coated or "substantially all" particles are coated. Similarly, the entire surface of a given particle may not be coated, again due to process conditions etc, as known to those skilled in the art. By way of example 10% or less of the surface of a given particle may not be coated. Thus within the process limits we can call these substantially coated surfaces as coated surfaces and a substantially coated particle networks or assemblies as coated particles. In this disclosure, this meaning of coated particles and surfaces and substantially coated particles and surfaces is to be understood. It should be noted that in many cases, by way of example, in the case of Ga—In alloy, there is a spontaneous formation of gallium oxide on the surface and a coating of thiol also can be applied. This it is possible that in such case some particles may not have thiol coating or a given particle may not be fully coated with thiol, but all particles are expected to be fully coated with the gallium oxide. Thus in this disclosure, when we say "coated" we mean "fully coated" or substantially coated". Also, in this disclosure the term encased also means "coated".

In some situations, it is possible to coat, for example with thiol, only a percentage of the particles, say as a non-limiting example 80%. This can be done by varying process conditions, by way of example, if we are using thiol, the amount of thiol solution and the concentration of thiol in the solution and other processing conditions. This it is to be understood that the principles and methods of this disclosure are applicable when only a fraction of the particle networks is coated, and when not the entire surface of a given particle is coated.

It should be realized that activation by applying mechanical pressure can be by a mechanical press, a patterned stamp or a tool, scribe or knife. As non-limiting examples. Activation can result in a conductive pattern. It is possible that in the case of certain materials activation, which is breaking up of the coating on particles to result in coalescence of particles, can be for purposes other than electrical conduction (e.g. changing surface characteristics. for example, surface roughness).

Figure 8:
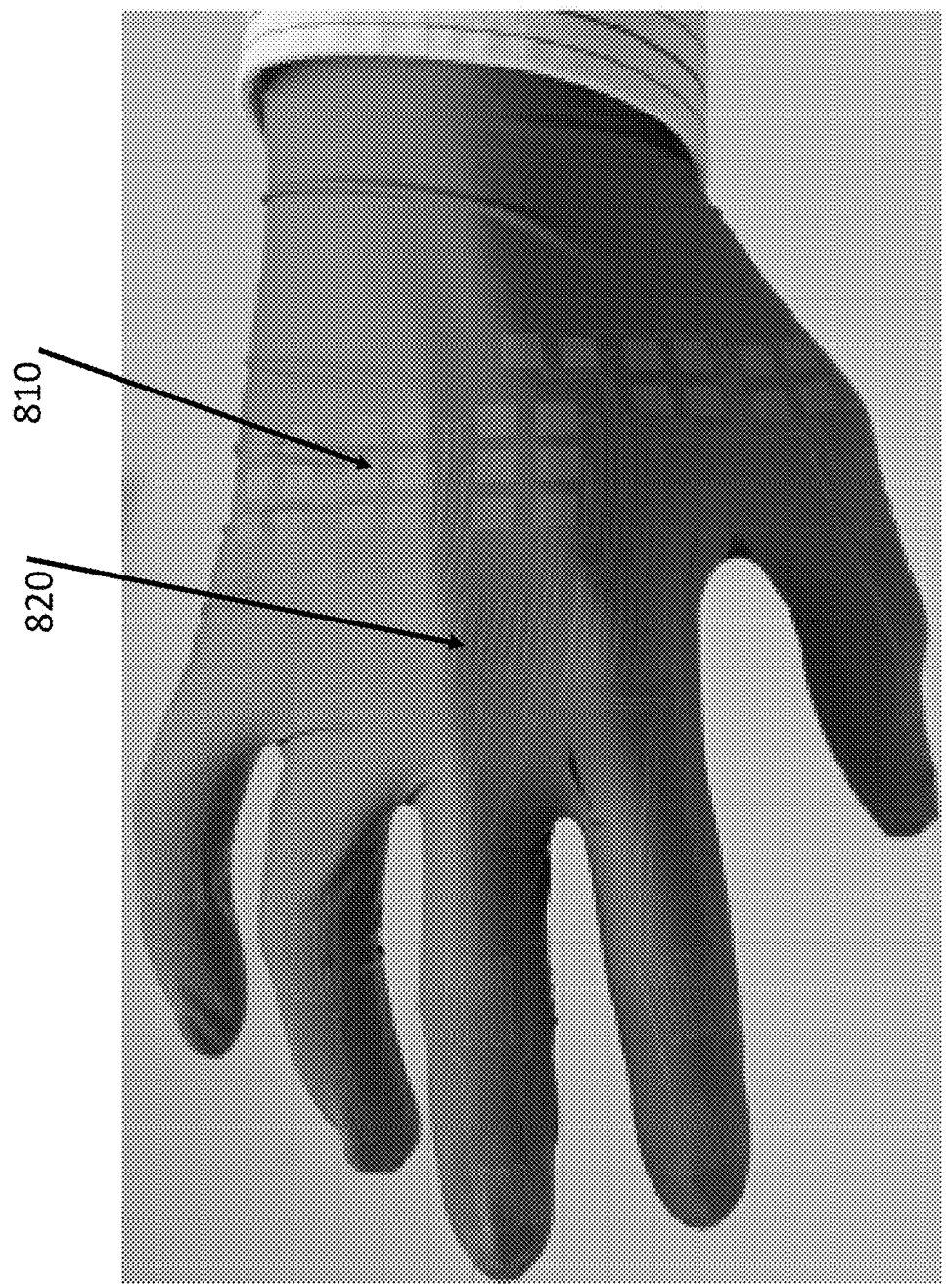
FIG. 8 shows a human hand wearing inkjet functionalized Nitrile glove with arrays of strain gauges, intricate wiring, and contact pads comprised of EgaInNPs.
Figure 9:
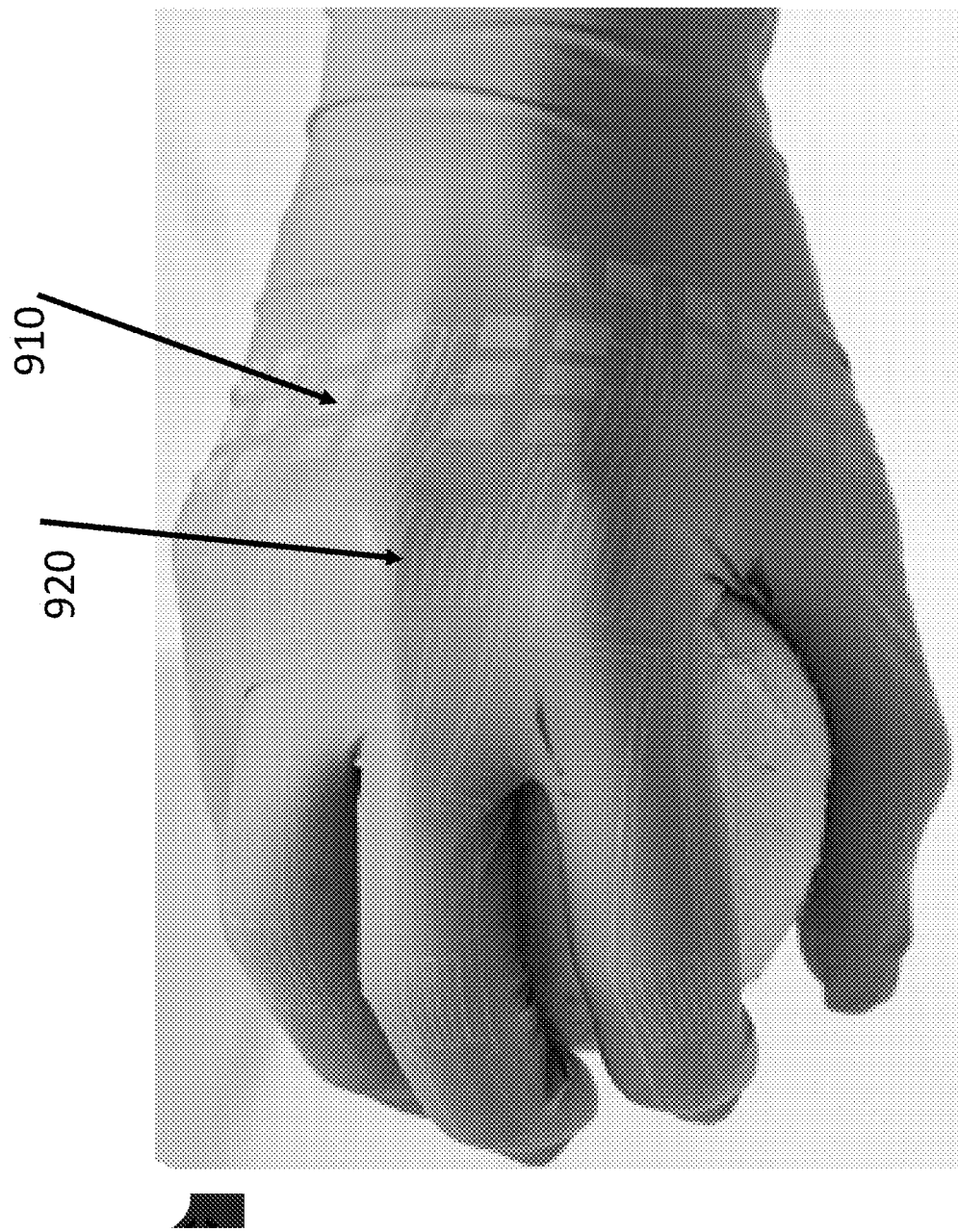
FIG. 9 shows the same human hand in FIG. 8 with glove containing ink-jet printed EgaInNPs, holding a tennis ball, demonstrating stretchability of the electronics.

Mechanically sinterable EGaInNP dispersions also provide a means for inkjet printing of EGaIn devices, a process not applicable to the bulk material in an oxygen-containing environment. By dispersing EGaInNPs, the resulting material displays properties more closely resembling the inkjettable carrier solvent. Sinterable EGaInNP dispersions can be inkjet printed directly onto an elastomer glove surface to form arrays of strain gauges with intricate wiring and contact pads. FIG. 8 shows a human hand wearing inkjet functionalized Nitrile glove with arrays of strain gauges, intricate wiring, and contact pads comprised of EgaInNPs. In FIGS. 8, 810 and 820 represent examples of conductive patterns of EGaInNPs produced by the methods of this disclosure. FIG. 9 shows the same human hand in FIG. 8 with glove containing ink-jet printed EgaInNPs, holding a tennis ball, demonstrating stretchability of the electronics. Referring to FIGS. 9, 910 and 920 represent the same patterns as 810 and 820 respectively in their stretched condition. These result represent an ability to manufacture liquid-metal devices using high-yield, high-throughput, and scalable processes.

It has been demonstrated in experiments of this disclosure that strain gauges produced as described above on a glove through ink-jet printing were functional and exhibited acceptable electrical characteristics. It should be realized that other methods of patterning other than ink-jet printing, include, but not limited to, screen printing and lithographic printing.

The substrates of this disclosure can vary. Non-limiting examples include but not limited to silicon wafers, insulated metal substrates, ceramic oxide materials, plastics, polymers etc. These substrates can be stretchable, wearable or both.

While the above description dealt with several experiments with eutectic Ga—In alloy, the principals and methods of this disclosure applicable to metals such as, but not limited to gallium, indium, and tin. The principles and methods are also applicable to alloys such as, but not limited to, Ga—In alloys and Ga—In—Sn alloy. It will be clear to those skilled in the art that other metals, alloys of two or more metals can lend themselves to the principles and methods described in this disclosure.

Thus in this disclosure it has been demonstrated that sonication and thiol self-assembly can be employed to create EGaInNPs with tunable average particle sizes from ≈600 nm down to ≈180 nm. These EGaInNPs represent a new class of mechanically sintered MNPs. The EGaInNPs encased with $Ga_2O_3$ requires an activation force per particle that scales with average particle size (sensitivity of ≈0.78 nN/nm), while capping EGaInNPs with thiol displays a softening effect (≈15% smaller activation force per particle). In this study, we also demonstrate two modes of mechanical sintering: global sintering, with the ability to sinter entire deposits at or above the mm scale; and local/selective sintering, with the ability to sinter areas within deposits as small as 1 µm and potentially smaller. Finally, we also show applicability to inkjet printed devices, a process not applicable to bulk EGaIn in an oxygen-containing environment.

While the above description focused on EGaIn nanoparticles (EGaInNPs) formed via sonication in ethanol, liquid-metal dispersions via sonication was achieved in different solvents (e.g. toluene and acetone). Two separate modalities of mechanical sintering were alo investigated: local/selective sintering, where local areas within a deposit of EGaIn nanoparticles (EGaInNPs) are sintered (sub-mm scale); and global sintering, where the entire deposit is sintered (at and above mm scale).

It should be further recognized that while the above description centered around a liquid metal or liquid alloy system, the principles and methods are applicable to any liquid material. Thus we have a method of processing a liquid a material which includes providing a liquid material which is then mixed with a solvent which can or has a constituent that can coat particles of the liquid material. In some embodiments this solvent can be a carrier fluid while in some embodiments this solvent can contain a stabilizing agent in addition to the carrier fluid. The liquid material mixed with such a solvent is then particlized, meaning as explained earlier, converting the liquid material into liquid particles with a desired size range. There are a variety of particlizing techniques available. In one embodiment of this disclosure, sonication is used as a particlization method. The particlized material is then deposited on a substrate. The deposited material is then activated according to a predefined pattern. In one embodiment, the activation is mechanical pressure resulting in a mechanical breaking of the coating on the particles resulting in a coalescence of the liquid particles leading to a conductive pattern according to the predefined patterns. It should be recognized that in some embodiments the substrate can be wearable and/or stretchable.

In one embodiment of this disclosure the diameter of the particles produced by particlization are in the range of 10 nm to 1000 nm. In a preferred embodiment, these particles are in the range of 50 nm-250 nm.

It should be realized that a solvent according to one embodiment of this disclosure can contain a carrier fluid such as ethanol and a stabilizing agent, that is, an agent that helps keep the particles in suspension, such as thiol. Examples of carrier fluids include but not limited to, ethanol, toluene, and acetone. In some embodiments of this disclosure, it is possible to use a carrier fluid itself as a solvent and not use a stabilizing agent. In such cases the carrier fluid itself is the solvent.

Based on the above, we can have a method making an electronic device wherein the method includes mixing a liquid material with a solvent which contains a constituent capable of coating particles of the material. The liquid material in the solvent is then particlized and the particlized material is deposited on a substrate forming a predefined pattern. The predetermined pattern is then activated, allowing coalescence of the liquid particles leading to mechanical sintering of the particles, resulting in electrical conductivity of the predetermined pattern forming an electronic device. It should be recognized that in one embodiment, the particles can be first deposited and then activated to form a predefined pattern with electrical conductivity. The substrate in these embodiments can be wearable and/or stretchable, and then it is recognized that the electronic device made thereof can also be wearable and/or stretchable.

In one embodiment of the disclosure, the electronic device made by the above described method is a strain gauge. Non-limiting examples of other electronic devices that can be made by the methods described above include sensors (non-limiting examples of sensors include sensors for strain, pressure, curvature, joint angle, and shear), antennas, electrical interconnects between electronic components, power circuits, electromagnets, threshold sensors. Variable stiffness materials can be used if utilizing the low melting temperature of GaIn alloys.

In another embodiment of this disclosure, an electronic device contains a substrate, and predefined electrically conductive patterns formed on the substrate by applying mechanical pressure on nanoparticle networks, wherein each particle has a coating on the surface which is disrupted by applying mechanical pressure resulting in the predefined pattern becoming electrically conducting.

In yet another embodiment of this disclosure, eutectic Ga—In alloy, which is liquid at about room temperature is mixed with a solvent containing ethanol and thiol, and the eutectic Ga—In alloy mixed in the solvent is particlized by sonication, wherein the particles have a diameter in the range of 10 nm to 1000 nm and are encased by the thiol in the solvent. The particlized eutectic Ga—In alloy is then deposited on silicon wafer, and the deposited eutectic Ga—In alloy is activated by applying mechanical pressure according to a predefined pattern. The mechanical pressure is such that the liquid particles of the activated material coalesce, resulting in electrical conductivity of the predefined pattern.

Non-limiting examples of the substrate in the embodiments of this disclosure are silicon wafer, ceramic materials, insulated metals, polymer materials, etc. It should be recognized that the substrates of this disclosure can be wearable or stretchable or both.

In general, it should be recognized that a predetermined pattern can be made during deposition or during activation. We can activate all or part of a deposited region. Likewise, we can either deposit an "unstructured" region or a "patterned" region.

In some embodiments the activation and the coalescence of the liquid particles can be for a purpose other than achieving electrical conductivity for the predefined pattern. A non-limiting example of such a purpose can be changing a surface characteristic such as, but not limited to, surface roughness. In some case, the activation, and the corresponding decrease in resistivity, can be used as an intermediate effect. For example, a tunable antenna could be achieved by only activating a desired length of deposited nanoparticle film. A one-time-use contact sensor could be fabricated by depositing a film of nanoparticles on a surface.

It should be recognized that the principles and methods described in this disclosure will find application a broad array of fields such as, but not limited to, soft robotics, conformable electronics, wireless communications, micro/nano-fluidics, wearable/implantable devices, and energy storage and transport systems.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method of processing a liquid material, the method comprising:
providing a liquid material;
mixing the liquid material with a solvent, the solvent containing a constituent possessing an attribute of coating particles of the material when a mixture of the solvent and the constituent is particlized;
particlizing the material mixed in the solvent, wherein at least 90% of the particles are substantially individually encased by the constituent of the solvent;
depositing the particlized material on a substrate such that the particlized material is non-conductive; and
applying mechanical pressure to the deposited material according to a predefined pattern, allowing coalescence of the deposited material in the predefined pattern resulting in the predefined pattern of the deposited material becoming electrically conductive.

2. The method of claim 1, the material is a liquid metal.

3. The method of claim 2, the metal is one of gallium, indium and tin.

4. The method of claim 1, the material is a liquid alloy.

5. The method of claim 4, the material is one of Ga—In alloy and Ga—In—Sn alloy.

6. The method of claim 5, the material is Ga—In alloy of eutectic composition.

7. The method of claim 1, the particlizing is by sonication.

8. The method of claim 1, wherein the deposition of the particlized material on the substrate is by one of ink jet printing and screen printing.

9. The method of claim 1, wherein the deposition of the particlized material on the substrate is by one of screen printing, lithographic printing, and drop casting.

10. The method of claim 1, wherein the substrate is one of a silicon wafer, a ceramic material, an insulated metal, a plastic material and a polymer.

11. The method of claim 1, wherein the substrate is a wearable material.

12. The method of claim 1, wherein the substrate is stretchable.

13. The method of claim 11, wherein the wearable material is stretchable.

14. The method of claim 1, wherein the solvent comprises a carrier fluid and a stabilizing agent.

15. The method of claim 1, wherein the liquid material is eutectic Ga—In alloy, the solvent is ethanol, the constituent is thiol, the particlization is achieved by sonication resulting in particles in the range of 10 nm to 1000 nm, and the substrate is wearable and stretchable.

16. A method of processing a liquid material, the method comprising:
providing a liquid material;
mixing the liquid material with a solvent, the solvent containing a constituent possessing an attribute of coating particles of the material when a mixture of the solvent and the constituent is particlized;
particlizing the material mixed in the solvent, wherein at least 90% of the particles are substantially individually encased by the constituent of the solvent;

depositing the particlized material on a substrate to form a predefined pattern of the particlized material such that the predefined pattern of the particlized material is non-conductive; and applying mechanical pressure to the predefined pattern, allowing coalescence of the material in the predefined pattern resulting in the predefined pattern becoming electrically conductive.

17. The method of claim 16, wherein the electrically conductive predefined pattern is an electronic device.

18. The method of claim 17, wherein the electronic device is a strain gauge.

19. The method of claim 17, wherein the electronic device is wearable.

20. The method of claim 17, wherein the electronic device is stretchable.

\* \* \* \* \*